United States Patent [19]

Burbank, III et al.

[11] Patent Number: 4,493,540
[45] Date of Patent: Jan. 15, 1985

[54] TRANSPORT APPARATUS FOR MICROFICHE CARDS

[75] Inventors: John E. Burbank, III, Ridgefield; John R. Montgomery, Fairfield, both of Conn.

[73] Assignee: Minnesota Mining and Manufacturing Company, St. Paul, Minn.

[21] Appl. No.: 474,538

[22] Filed: Mar. 11, 1983

[51] Int. Cl.³ .............................................. G03B 23/08
[52] U.S. Cl. .................................... 353/122; 353/103; 353/25; 353/117
[58] Field of Search ...................... 353/25, 26 R, 26 A, 353/27 R, 27 A, 103, 107, 118, 116, 117; 209/617, 552, 608, 583, 610

[56] References Cited

U.S. PATENT DOCUMENTS

| | | |
|---|---|---|
| 3,124,260 | 3/1964 | Tidball ............................ 353/25 X |
| 3,429,436 | 2/1969 | Irasek . |
| 3,458,253 | 7/1969 | Hansen ............................ 353/25 X |
| 3,604,850 | 9/1971 | Eckenbrecht et al. . |
| 3,753,240 | 8/1973 | Merwin . |
| 4,190,899 | 2/1980 | Smith et al. . |
| 4,273,427 | 6/1981 | Bailey . |

Primary Examiner—Harry N. Haroian
Attorney, Agent, or Firm—Donald M. Sell; James A. Smith; John C. Barnes

[57] ABSTRACT

A microfiche card storage and retrieval system comprising a carousel for storing microfiche cards, card transport means for inserting and retracting microfiche cards from said carousel, said card transport device having an extended position in the plane of its movement, a card load-unload chute disposed above said carousel and defining a card-receiving chute in the plane of movement of said card transport device, the card-receiving chute comprising stop means across the chute to prevent a card from inadvertently being moved into the storage and retrieval system, means for retracting said stop means, means adjacent one edge of said chute for limiting the height of the chute to prevent oversized cards from being inserted through the chute into the storage and retrieval system, and means opposite the insert side of said chute for guiding a microfiche card moved by said transport means into said chute.

6 Claims, 13 Drawing Figures

TRANSPORT APPARATUS FOR MICROFICHE CARDS

BACKGROUND OF THE INVENTION

1. Field of the Invention

This invention relates to an apparatus for storing and retrieving microfilm images stored on cards of film known as microfiche cards, and in one aspect to an improved apparatus for extracting the card from the storage position and positioning the same at a viewing station and returning the card to its storage position.

2. Description of the Art

Machines for storing microfiche cards and for the retrieval of the microfiche cards to display individual images and project the same either on a screen, make a hard copy of the image, or position the microfiche such that a video signal may be generated by scanning the film for projection on a remote terminal are known. Examples of patents disclosing microfiche retrieval systems of the type addressed herein are U.S. Pat. Nos. 3,429,436, issued Feb. 25, 1969, to E. H. Irasek; 4,190,899, issued Feb. 26, 1980, to D. H. Smith et al; and 4,273,427, issued June 16, 1981 to D. C. Bailey. Numerous additional patents exist relating to devices for scanning microfiche cards or other microfilm image-supporting media such that the information on the microfilm image may be retrieved and reread by a projection image or by duplication on a CRT terminal. Examples of such devices are illustrated in U.S. Pat. Nos. 3,753,240, issued Aug. 14, 1973 to Roy L. Merwin; and 3,604,850, issued Sept. 14, 1971 to R. R. Eckenbrecht et al.

These systems provide a means for storing information which must be stored on a photographic medium and retrievable automatically by suitable coding logic stored in a computer. The actual storage and retrieval device will respond to the signals to rotate the storage file to locate the predetermined microfiche card at the retrieval opening such that it may be removed from the file and a specific image on the card positioned for reading the image either by projection, by scanning, or by copying.

The present invention thus deals with the file for storing the microfiche cards, accessing the microfiche cards to a card-handling mechanism for picking the cards from the file and operable on an XY axis to orient a specific image on the card at the film reading station, for moving the card to position another image at the film reading station and then to the structure for reinserting the microfiche card in the file, delivering the card to the operator through an opening into the file, or dumping the card from the file. The mechanism utilized for storing the microfiche card comprises a pair of trays, fixed on a rotatable axis and positionable to place a given one of the storage slots in one or the other of the trays at the access opening. Picker fingers then grasp the microfiche card, lift the card slightly off the tray, straighten (by tensioning) the leading edge of the card and withdraw it from the file. Separators for separating the adjacent cards from the selected card aid the fingers to grasp the microfiche card and position the card at the viewing station. Thus, the visual patterns stored in the microfiche card can be optically scanned to convert the image pattern electrically to signals which by analog-to-digital conversion and speed conversion are transmitted to remote terminals along with alphanumeric data for review by an operator. The equipment of this invention will make visual patterns stored on-line in a control system totally computer driven and accessible. When the information has been viewed the microfiche card is reinserted into the slot in the tray and the separators for the adjacent microfiche cards are returned to their normal position and the tray carousel is rapidly indexed to locate the next microfiche card called for by the computer.

During insertion of the microfiche cards, which are four to eight mils in thickness and quite susceptible to bending or buckling during mechanical handling of the microfiche cards, the cards may become damaged or destroyed. It is therefore important the equipment handle the cards in such a manner as to sense if some abnormality exists in the card or in the operation of the equipment such that the card may be reinserted without being forced, if in fact, the card approaches the storage slot and strikes an obstruction causing it to be slightly bent, bowed, or bucked.

It is thus important to the present invention that the microfiche cards be inserted into the storage and retrieval system by the machine such that all of the handling of the card is carried out by the machine, including the loading of the microfiche into the carousel trays, taking a card from the tray and positioning it at the viewing aperture and returning the card to the storage tray or returning the card through a load-unload slot to the operator. To accomplish this purpose, a novel microfiche card transport system is provided for moving the card in a plane with respect to the carousel and with respect to the load-unload slot and with respect to the viewing aperture. Thus the present invention provides a mechanism for loading a card presented to the system at a load slot and precisely positioning the microfiche card in a slot in the storage tray and being able to retrieve the card from the storage tray and move it in an XY coordinate plane to the viewing station to precisely position an image bearing frame of the microfiche at the viewing station, to discharge the card from the storage system or to return the card to its position in the storage tray.

SUMMARY OF THE INVENTION

The present invention relates to an improvement in apparatus for storing microfiche cards and affording random access to a card and to a particular image area on the card. The device of the present invention provides a tray for storing a plurality of microfiche cards in a manner to afford access to each of the cards in a predetermined plane for retrieval. A load-unload area for the system being disposed in the plane of said microfiche card at said access opening, and transport means mounted for movement within the plane to move said microfiche cards readily within the plane in directions to take a card from said load-unload area and move it in the X direction and then in the Y direction and then again in the X direction to place the same in said storage means. The means for moving the microfiche cards comprise means for mechanically grasping the microfiche cards by an edge thereof. The means for grasping an edge of the card is mounted on a carriage and movable therewith. The carriage is mounted on a frame and movable relative to said frame. The means mounting said frame affords movement of the frame relative to the card storage means and the load-unload area for transporting the microfiche cards. The transport means further comprising means for moving the carriage in increments in response to predetermined electrical signals for positioning the microfiche card. The position of said carriage is determined by the number of steps the frame or carriage may be from a predetermined home position of each of said carriage and said frame as determined by sensing means disposed adjacent the drive means for said frame and said carriage.

BRIEF DESCRIPTION OF THE DRAWINGS

The present invention will be described with reference to the accompanying drawing wherein.

DESCRIPTION OF THE PREFERRED EMBODIMENTS

The present invention is directed at an improvement in a microfiche card storage and retrieval assembly which permits visible patterns stored in the microfiche card to be retrieved on-line at the direction of a computer and through optical to electrical conversion, analog-to-digital conversion and speed conversion to be transmitted to a remote terminal along with alphanumeric data from the computer or additional storage memories.

The device of the present invention comprises a carousel assembly in which a plurality of microfiche can be stored and provides a loading station positioned vertically above the carousel assembly where the operator may insert or retrieve microfiche to be stored or removed from the system. The position of this load station in vertical alignment with the load and unload slots for the two trays of the carousel assembly makes it very convenient to use the same picker fingers which transport the cards in and out of the carousel to receive or extract a card from the entire system. The card storage and retrieval system of the present invention is also provided with a novel microfiche card transport apparatus including the card grasping and transport fingers which afford also the feature of straightening the microfiche cards as they are extracted from the storage carousel to provide greater precision in the handling of the microfiche within the system. Further, the card storage and retrieval system of the present invention comprises an improved microfiche card guidance and buckling detection system such that the microfiche card, upon which valuable information is stored, is not destroyed when there is some malfunction in the system which may result in a card not being able to move as anticipated, resulting in the card bowing or buckling. The guidance system of the present invention would detect any buckling of the card during re-entry of the card into the carousel storage or into the load station such that the system would discontinue further operation of the programmed maneuver and restrict any permanent damage to a microfiche card. These novel aspects of the present system will be described in greater detail.

The system of the present invention comprises a frame 10 which serves as the primary support and includes a cast base plate 11 supporting upwardly projecting fixed support struts 12 and 14. The struts support a vertical wall defined by plates 13 and 15 separating the device transversely.

Figure 1:
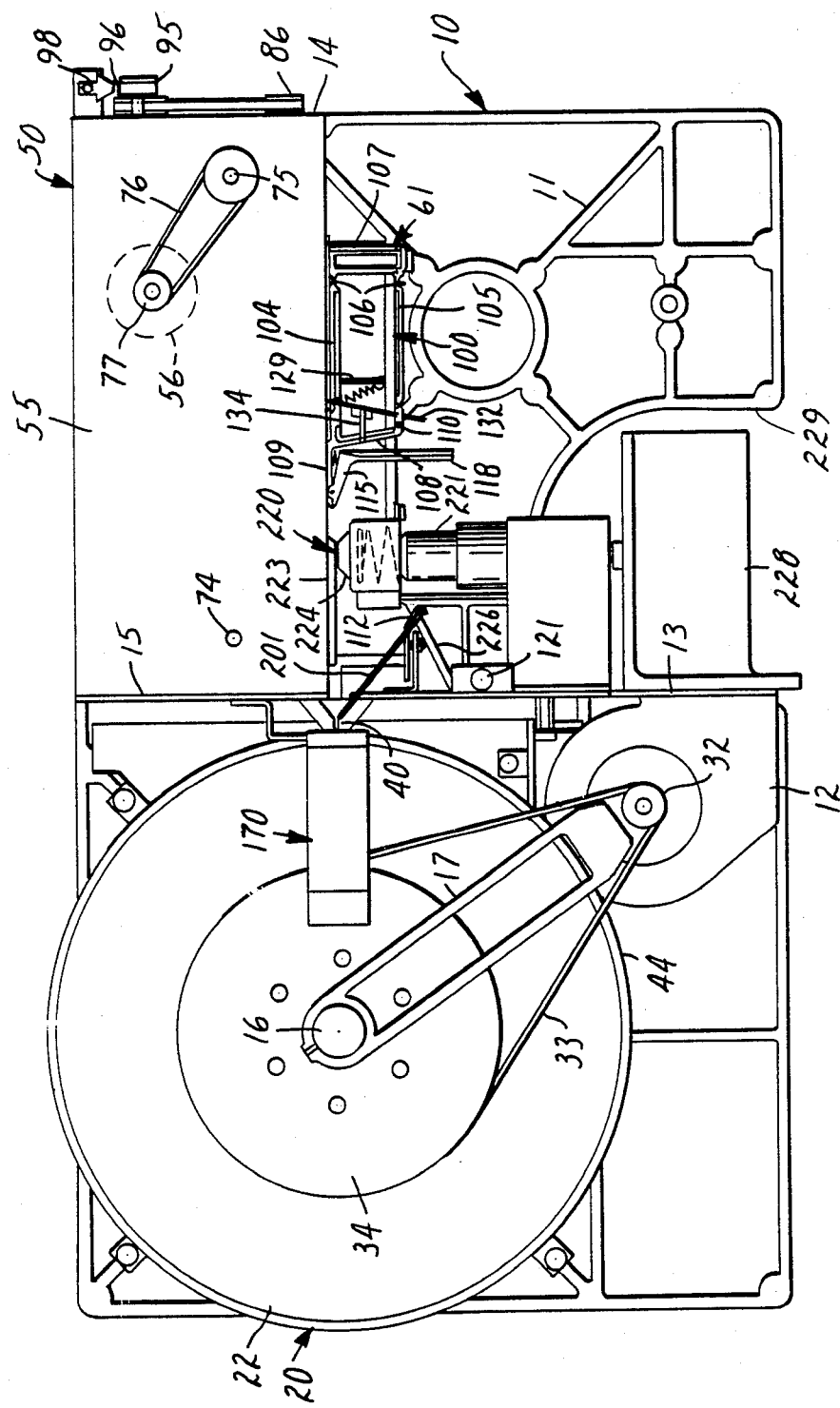
FIG. 1 is a plan view of the microfiche card storage and retrieval system hardware of which the present invention is a part.
Figure 2:
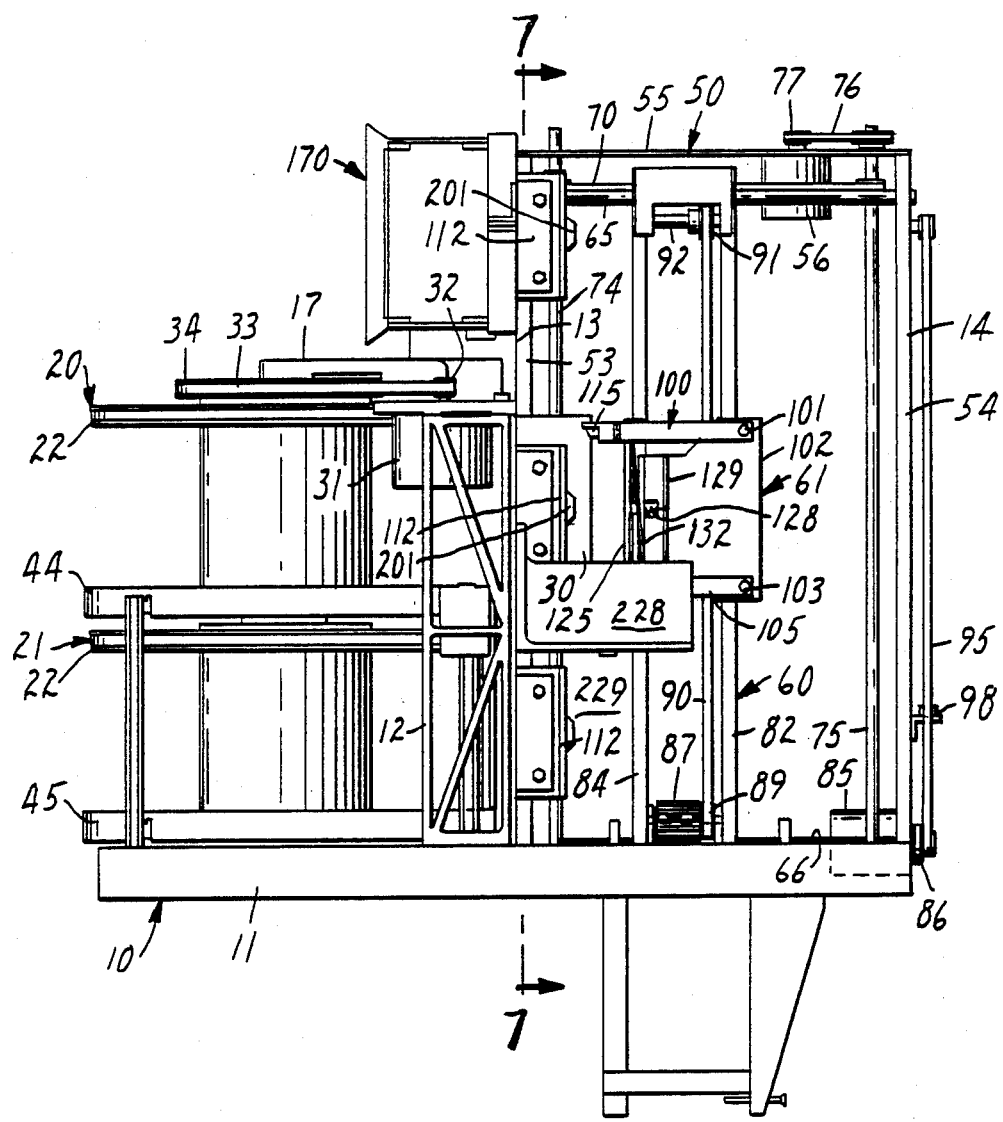
FIG. 2 is a side elevational view of the microfiche card storage and retrieval system of FIG. 1.
Figure 8:
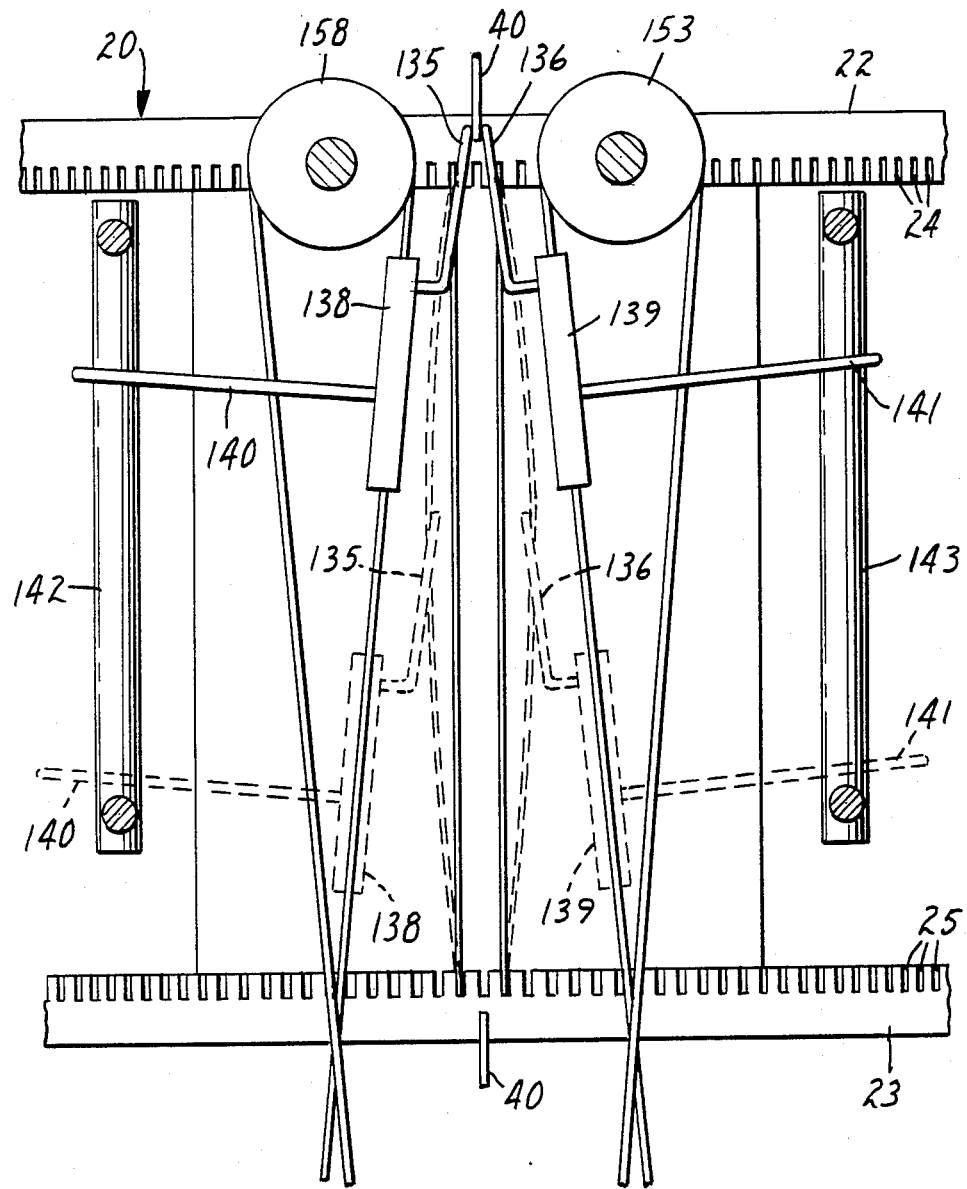
FIG. 8 is an enlarged fragmentary vertical sectional view of part of the card spreading mechanism illustrated in FIG. 7.
Figure 11:
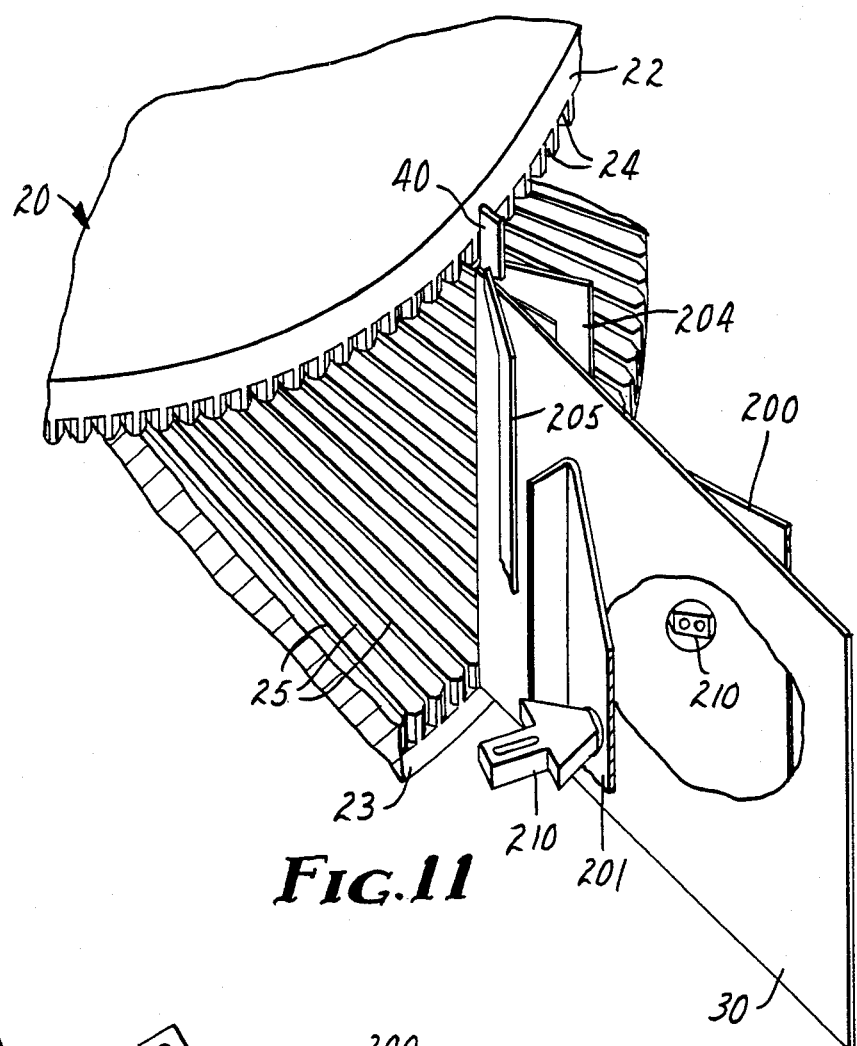
FIG. 11 is a perspective view of the card guidance and buckling detection system.

A vertically supported shaft 16, suitably fixed in the base 11 and in a support member 17 projecting from the vertical strut 12, journals a pair of axially aligned and rotatably fixed trays or carousels 20 and 21. The carousels are each provided with a pair of axially spaced horizontally positioned flanges 22 and 23 (see FIG. 11) which are each formed with axially aligned and oppositely opening grooves 24 and 25 respectively, for receiving a plurality of microfiche cards 30. Thus the plane of each of the cards is oriented parallel to the axis of the carousel. In order to position the carousel such that a preselected microfiche card 30 can be disposed at the retrieval opening, the carousels are driven by a stepping motor 31 which drives a pulley 32 around which is trained a timing belt 33 joined to a larger diameter pulley 34 on the upper carousel 20. Belt 33 permits the motor to thus drive the carousel with precision to position one of the many slots in each carousel to a predetermined aligned position with the slot between plates 13 and 15 at insertion and retrieval station precisely located by an aiming blade 40 positioned adjacent the peripheral edge of the carousels 20 and 21. The aiming blades 40 are illustrated in FIGS. 1 and 8. Positioned about the lower flange of each tray of the carousel is a band 44 and 45 respectively, which retains the cards in the slots of the trays and prevents them from being forced centrifugally from the trays upon rotation of the carousel by the motor 31.

The vertical wall members 13 and 15 separate the carousel storage area of the device and the card-handling and transport mechanism which serves to pick the selected card from either tray of the carousel, withdraw it and position it and selected images thereon at the reading or view station 220. This microfiche card transport mechanism is generally designated 50 and is supported by the vertical frame 14 comprising a fixed upright 53 positioned adjacent the wall 15 and a spaced upright 54 positioned away from the wall 15. The uprights 53 and 54 are generally grid-like members and support at their upper ends a plate 55 which supports the drive motor 56, affording the horizontal movement of a carriage mechanism 60 upon which is mounted the microfiche card transport assembly, generally designated 61 which supports the picker fingers for grasping the microfiche card 30.

The carriage 60 is an elongate generally rectangular vertically positioned frame having guide means for guiding the same along horizontally positioned guide shafts 65 and 66. The upper guide shaft 65 is fixed stationary within the frame 14 and supports slides or guide members mounted on the upper end of the frame 60 to permit movement of the frame 60 along the X axis for positioning the card transport member 61. The lower end of the frame 60 is supported on the shaft 66 which is rotatably mounted and comprises a pinion shaft which constitutes the drive member for moving the card transport 61 vertically with respect to the carriage 60.

Figure 3:
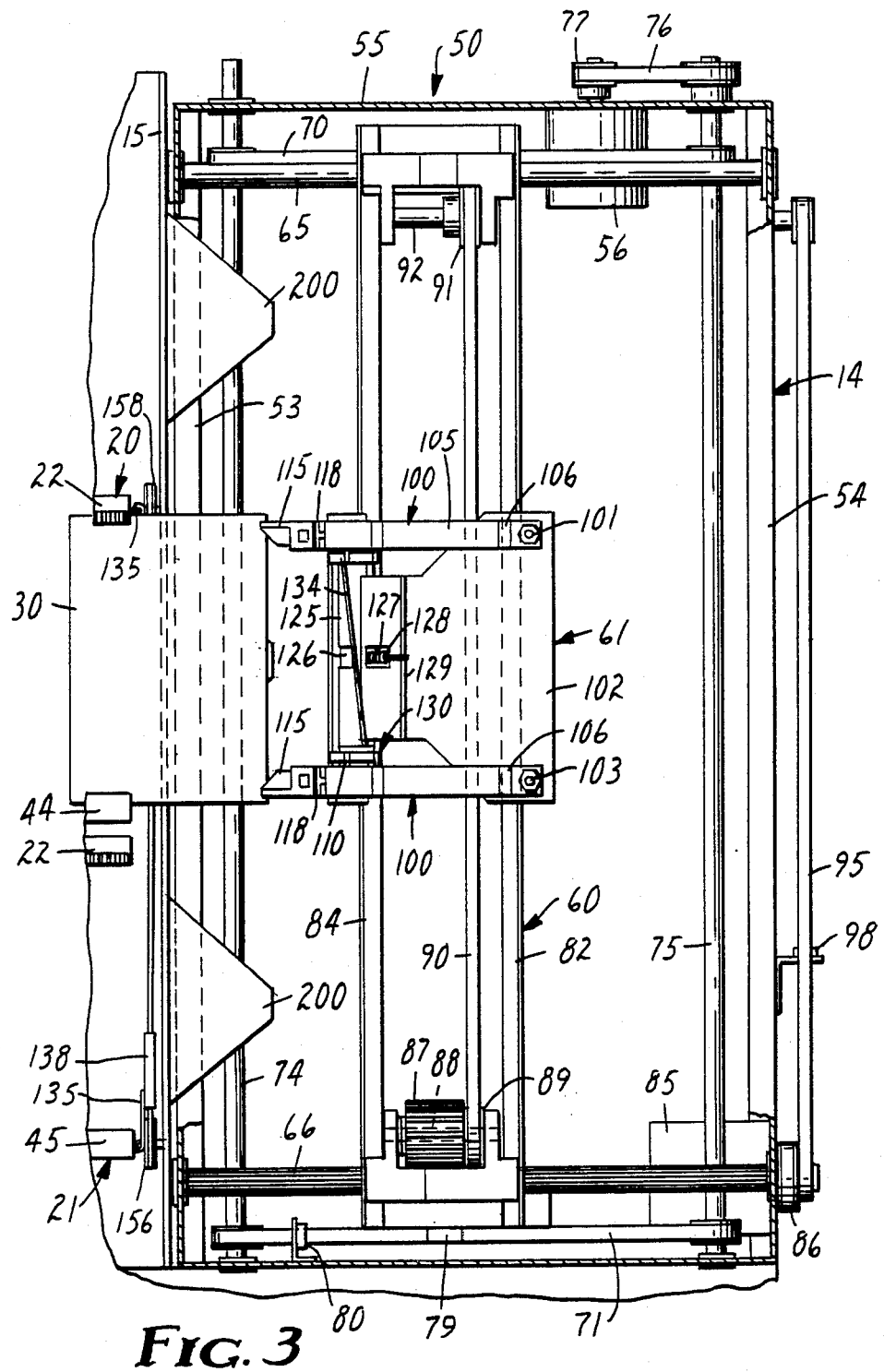
FIG. 3 is an enlarged detail side elevational view of the microfiche card transport system.

The carriage 60 is moved along the shaft 65 and shaft 66 by a pair of belts 70 and 71. The belts 70 and 71 are fixed to the carriage 60 and are trained about pulleys supported on two spaced vertically disposed and rotatably journalled shafts 74 and 75. Shaft 75 extends above the plate 55 and has a pulley receiving the timing belt 76 from the drive pulley 77 of the motor 56. The belts 70 and 71 are timing belts and are coupled to the carriage 60 to move the carriage with great precision upon movement of the drive motor 56 in either direction. A reflective spot or member 79 (see FIG. 3) on belt 71 cooperates with a light emitting and receiving sensor 80 to signal the home position of the carriage 60 when the member 79 is positioned at the sensor 80.

The carriage 60 has two vertically disposed guide members 82 and 84 which serve to guide the microfiche card transport assembly 61. The assembly 61 is movable by suitable guides 81 (FIG. 5) along the members 82 and 84 under the driving force of a motor 85 which drives a timing belt 86 entrained around a pulley on one end of the pinion shaft 66 to drive the shaft 66. Rotatably mounted on the carriage 60 is a first drive gear 87 which is rotatably mounted on a shaft 88 and drives a timing pulley 89 and a timing belt 90. The timing belt 90 is an endless belt entrained around the pulley 89 and a pulley 91 supported by a rotatable shaft 92 at the upper end of the carriage 60. The belt 90 is connected to the card transport assembly 61 to move the assembly 61 vertically in response to rotation of the shaft 66 by the motor 85. A second endless belt 95 is driven from the motor shaft 85 to move a light reflective spot or member 96 thereon vertically along a path past a sensing device 98 (FIG. 3) which senses the home position of the card transport assembly 61 along the Y axis of its movement.

The motors 56 and 85 may be operated simultaneously to rapidly move a microfiche card in a diagonal direction with respect to the frame 14 and the motors can operate independently to rapidly move the card transport assembly 61 along either the X or the Y axis of its movement.

Figure 4:
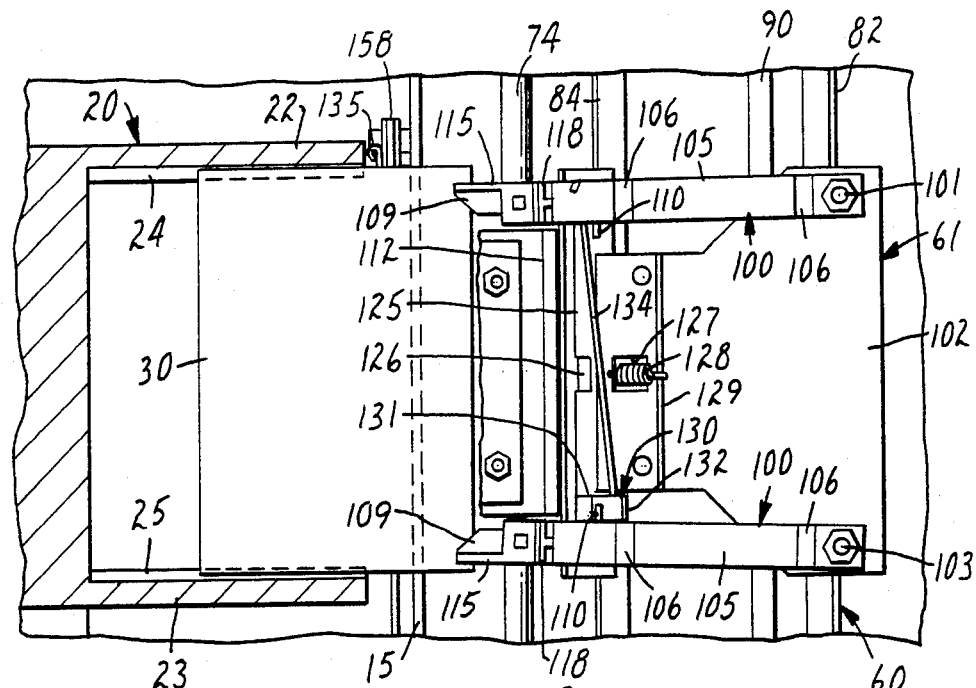
FIG. 4 is an enlarged detailed side elevational view of the picker for grasping the microfiche card.
Figure 4A:
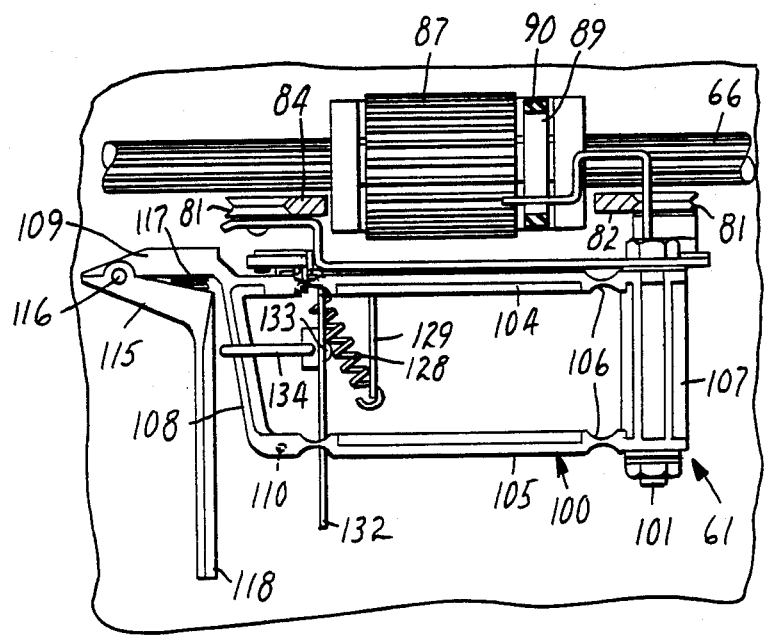
FIG. 4A is an enlarged fragmentary transverse sectional view showing the picker fingers in plan view.
Figure 5:
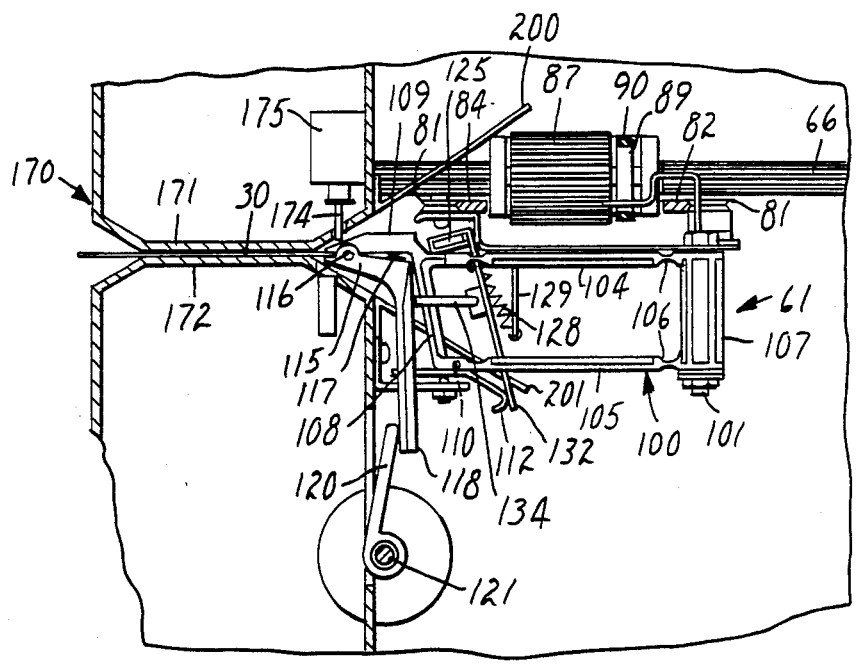
FIG. 5 is a plan view of the picker fingers positioned at the load aperture.
Figure 6:
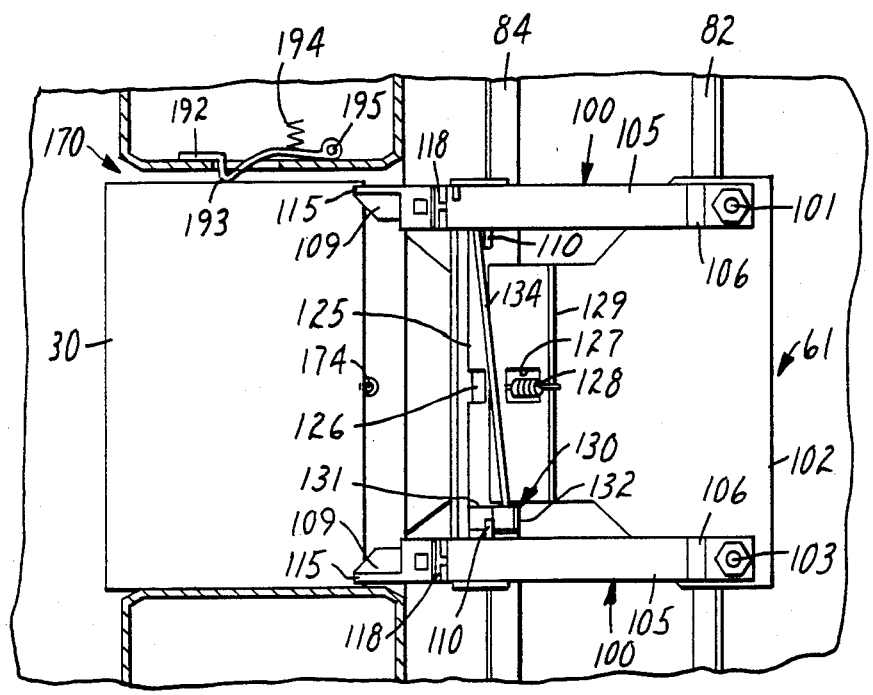
FIG. 6 is a side elevational view of the picker fingers with the card in the transport position.

Referring now to FIGS. 4 through 6, the microfiche card transport assembly 61 will be described in greater detail. As illustrated, the assembly comprises pairs of picker fingers which are insertable in the slot between the walls 13 and 15 to reach between the flanges of either carousel or into the card load or unloading station 170 to grasp a microfiche card 30. The pairs of picker fingers are formed one on each of two allochiral generally rectangular frame assemblies 100. The picker frame assembly 100 is illustrated in plan view in FIGS. 4A and 5 and will be described in greater detail. The upper frame is deflected about an axis of a stud 101 supported from the main plate 102 of the assembly 61.

The lower frame 100 is supported on and deflected about a similar pin 103.

The frame assemblies 100 are molded and comprise a pair of generally parallel side members 104 and 105 which are joined through reduced thickness flexure lengths 106 to a bushing 107 which surrounds the stud 101. On the opposite end of each of the members 104 and 105 are a pair of fingers or opposed jaw members, joined through similar reduced thickness flexure lengths 106 to an angularly directed link 108 which joins a projecting finger 109 formed on the extended end of the member 104. A pin 110 supported on the member 105 adjacent the link 108 serves to guide the position of the finger 109 as it moves in a position to grasp a card 30 or return a card 30. The pin 110 engages a fixed aiming cam 112. Pivotally mounted opposite the finger 109 of each assembly 100 is a pivotal finger 115 which is pivoted about an axis 116 under the bias of a spring 117 to urge the fingers to a closed position against a microfiche card 30. The finger 115 has a leg 118 which is disposed at an angle thereto and extends beyond the member 105 to a position engageable by a movable cam 120 mounted on a cam shaft 121. The cam shaft 121 has a plurality of the cams 120 positioned in axially spaced relation therealong to rotate therewith and actuate the fingers 115 when in a position to grasp or release a microfiche card 30.

The assembly 61 also includes a tip lever 125 which is mounted adjacent the members 104. The lever 125 is held in position by a sheet metal plate 126 which wraps about one edge of the lever 125 and extends along the back side of the lever and then through an opening 127 in bracket 129. A spring 128 is connected to the plate 126 and to the bracket 129 projecting forward from the plate 102. A lever member 130 is connected to the lever 125 between the assemblies 100. The lever member 130 has the short leg 131 connected to the tip lever 125 below one corner of the support plate 102 and the other leg 132 projects at an angle thereto past the lower side member 105. An eye 133 is formed on the lever members 130 intermediate the ends of leg 132. A wire formed tension link 134 is joined to the eye 133 and to the angularly directed link 108 of the upper assembly 100 and is therefore disposed at an angle to the lever 125. The outwardly extending leg 132 is engageable by the microfiche guide plate members 112 fixed on the plate 13 to cause the lever member 130 to pivot the tip lever 125 about a vertical axis defined by the left hand vertical edge of the L-shaped bracket 129 against the bias of spring 128. This movement pulls on one end of link 134 via eye 133 to draw the upper finger assembly 100 toward the other assembly 100 as will hereinafter be described.

The frame 100 is normally very compliant through the flexures 106 adjacent the finger supporting end. As the fingers approach the carousel the finger is aimed accurately toward the card 30 by tip lever 125 spring loading the fingers in one direction while the pins 110 of the members 105 ride against a precisely located cam surface of the fixed cams 112. The lever member 130 tips the lever 125 and also brings the upper pair of fingers toward the lower pair of fingers. The amount of movement of the upper fingers, i.e., $\Delta y$ is determined by the amount of movement of the eye 133 and the length of the tension link 134.

The side views shown in FIGS. 4 and 6 show the action of the pickers in removing or inserting a card 30 into the carousel or the load station. As the support assembly 61 approaches the carousel or other station the lever member leg 132 encounters the card guide plate and is deflected rearward relative to the assembly 61. This causes the top picker assembly 100 to be deflected downward an amount controlled by the location of the card guide plate and the defection of leg 132 and eye 133 as explained above. Meanwhile, the cam shaft 121 has been driven by a rotary solenoid and the finger 115 has been opened under the urging of the cam 120. Thus the finger will be open where it will be able to grip a card 30. The cam is then returned and the finger 115 is closed under the urging of spring 117 to grip the card and the carriage assembly is moved along its X axis and the lever 130 is released from the guide plate which allows the top picker assembly 100 to deflect upward. This deflection of the upper member 100 away from the other member will tension the side of the card 30 disposed between the pairs of fingers. The stress allowed to urge the fingers 109 apart is shared by both pairs of picker fingers and they will each move upward a distance equal to half of the original deflection of the upper assembly. When properly calibrated, this action straightens the edge of the card and lifts the card so that the top and the bottom edges do not contact the top or bottom of the slot in the carousel tray from which the card is removed. This automatically provides an almost frictionless card removal and insertion when the card is returned to either the same slot in the carousel or another slot including the slot in the load and unload station. Because all of the slots for the cards are located by precise construction of the assembly, the card when it is gripped between the pairs of fingers, will maintain the spaced relation between the top edge and the bottom edge of the slots.

An assist to the picker fingers in grasping the proper card 30 and extracting or returning the card to a position in one of the trays is afforded by a card separation mechanism which is utilized to engage the cards adjacent a selected card and separate the same to keep them from getting in the path of the card which is being extracted or returned. This is accomplished by a pair of spreader fingers which deflect the leading edges of the adjacent cards. This is very helpful because of the compact nature of the trays and the closely positioned cards can become bent and bowed, from standing on their edges, particularly when the cards are formed of relatively thin, i.e, 4 mil, film.

Figure 7:
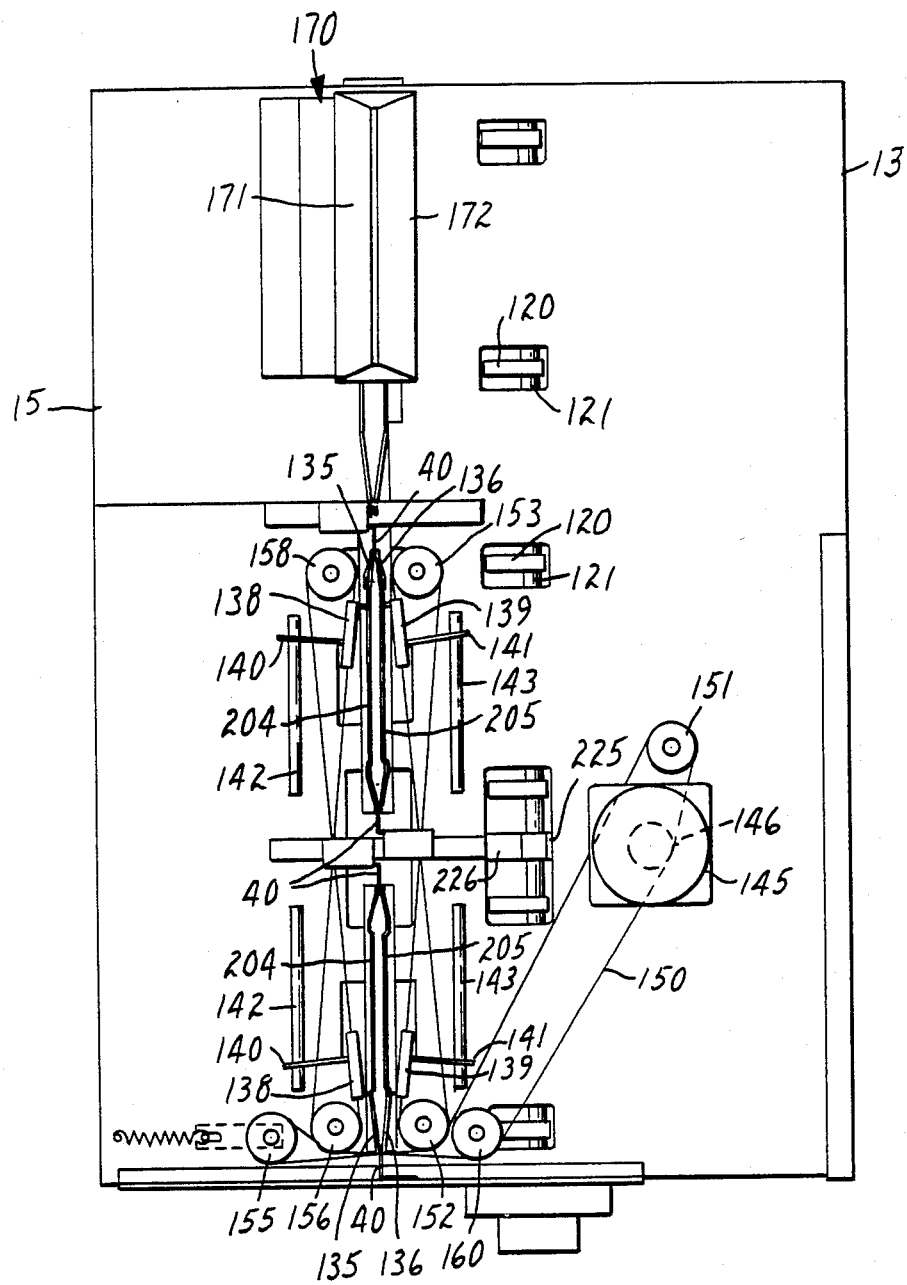
FIG. 7 is a vertical sectional view taken along the lines 7—7 of FIG. 2.

Referring now to FIGS. 7, 8, 9, and 10 the card separating mechanism will be described. FIG. 7 shows a vertical sectional view of the card storage and retrieval device from the side of the wall opposite the card transport illustrating the card spreading mechanism in the "parked" position. In this position the carousel can be rotated to index the desired card at the removal station. The spreader mechanism comprises two pair of wire formed fingers which, in the parked position, are positioned on opposite sides of a pair of aiming plates 40. The plates 40 are fixed in the machine with one above the flange 22 of the top tray 20 and one adjacent the bottom flange 23 of the lower tray 21. The aiming plates 40 assure that the spreader fingers get off to an accurate start when they are moved onto the card 30. In FIG. 8, the spreading mechanism for the top tray is illustrated and will be specifically described. Spreading fingers 135 and 136 are carried by mounting blocks 138 and 139 which secure the fingers to the drive cable. The mounting blocks 138 and 139 are also provided with stablizing pins 140 and 141 respectively, extending outwardly therefrom and which engage guide bars 142 and 143. As the mounting blocks are moved under the driving force of the cable, the fingers 135 and 136 move off the aiming plate 40, downwardly, (upwardly for the lower set of fingers) and follow the path of the cable to separate progressively as they move toward the center of the cards 30 adjacent the card to be removed or adjacent the empty slot in which a card will be inserted. The spreading fingers for both the upper tray 20 and the lower tray 21 are connected by a common cable 150 which is driven by a motor 145 having a drive pulley 146 around which the cable is wrapped and to which the ends of the cable are secured. Referring now to FIG. 7, rotation of the motor 145 drives the cable 150 in either direction to move the spreading fingers 135 and 136 to the parked position or to their card spreading positions. The cable 150 moves from the pulley 146 over an idler pulley 151 past a lower guide pulley 152 and then to the first guide block 139 and counterclockwise around an upper guide pulley 153 to a second mounting block 139 and down clockwise around the pulley 152 to a tensioning idler roller 155 from which the cable goes back counterclockwise around a lower guide pulley 156 up to the mounting block 138 and around an upper guide pulley 158 to the last guide block 138. From the guide block 138 on the upper spreaders the cable goes around the pulley 156 counterclockwise to a lower idler pulley 160 and back to the drive pulley 146.

Figures 9, 10:
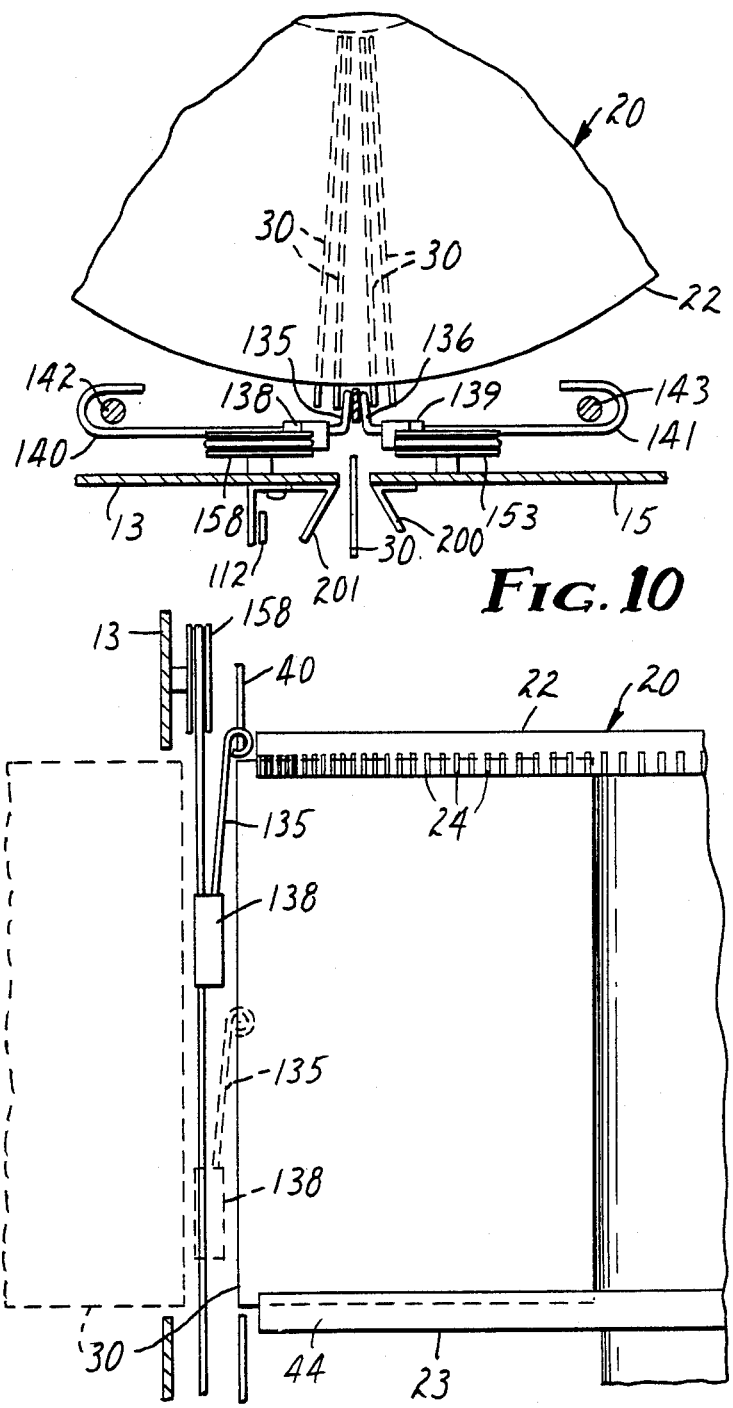
FIG. 9 is a detail side elevational view of the spreading fingers.
FIG. 10 is a horizontal sectional view showing the spreading fingers of FIG. 9.

Thus as the motor 145 is driven through a partial rotation the two sets of spreader fingers 135 and 136 are moved from the aiming blades 40 toward the centers of the trays between the grooved flanges thereof until they stop at a midpoint as illustrated in dotted lines in FIGS. 8 and 9 to separate the cards 30 adjacent the card to be removed such that any bowing of these neighboring cards will not interfere with the insertion or the grasping of the selected card.

Cards are inserted into the storage device through a load station generally designated 170 and positioned vertically above the carousels in the plane of the loading slots of the carousel at the removal station. This loading station 170 provides a slot defined between two spaced plates 171 and 172 to insert a card 30 against a stop pin 174 driven by a solenoid 175 across the slot defined by the plates 171 and 172. The pin 174 is normally in the blocking position such that the operator cannot inadvertently strike a card 30 and send the same into the storage apparatus without it being picked up by the picker fingers of the card transport assembly 61.

A brake is also provided in the loading area to prevent the insertion of microfiche cards of a dimension exceeding the tolerances established between the flanges of the carousel trays for receiving microfiche cards. This brake mechanism comprises a metal form 192 which is mounted above the slot defined by the plates 171 and 172 and has a projecting end portion 193 which depends downwardly into the slot sufficiently to contact the upper edge of a card 30 which exceeds the permitted tolerance. The member 192 is biased into position by a spring 194 about a pivot axis 195, see FIG. 6. The brake 192 does not interfere with removal on the unloading of a card as it is easily pivoted to an out-of-the-way position if struck by a card.

Figure 12:
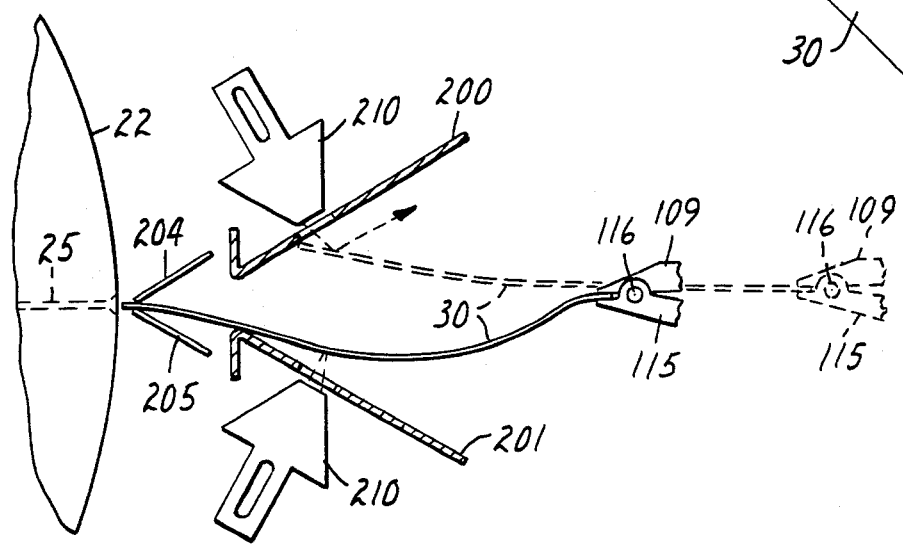
FIG. 12 is a diagrammatic horizontal sectional view of the guidance and buckling detection system showing the card in broken lines as it begins its travel into the carousel, and showing the card in solid lines when travel of the microfiche card is interrupted by an obstacle of one type or another.

The microfiche cards are supported vertically by one edge and they must be guided back into the trays of the carousel or into the loading and unloading station 170. To accomplish this, funnel-shaped guide plates are provided to direct the free unsupported end toward the designated slot. These guide plates are illustrated in FIG. 12. The first set of the plates, plates 200 and 201 are supported from plates 13 and 15 at each of the three stations. The plates 200 and 201 will contact the free end of the microfiche 30 and direct the same into more restricting flexible guide plates 204 and 205 as it approaches the designated slot in the carousel tray or unload station. In the event that there is some obstruction or a bend in the card which prevents its free entry between the guide plates 200 and 201 into the flexible funnel guide plates 204 and 205 an optical sensor 210 positioned on each side of the card 30 is operating to detect the card if and only if the card should buckle and be deflected toward the sensor. The fixed guide plates 200 and 201 provide the preliminary guidance for the leading edge of the harmlessly meandering card 30. Should the card begin to buckle as indicated by the solid line position of card 30 in FIG. 12, it can become bowed enough to be detected by one of the optical sensors 210. The card may be positioned during its return very close or within the range of a sensor 210 but it is not detected unless it is positioned at such an angle as to reflect the light beam from the sensor 210 back to a light receiving sensor. The detection range of each sensor is short enough so that it cannot detect a bowed or buckled microfiche card which has moved from the center toward the other detector. The path of the light beam for the sensors is illustrated by the arrows leading from the sensors 210. The sensors 210 comprise a low energy light source such as a light emitting diode and a phototransistor to receive the signal of the bowed card and send the same back to the electonic control system for the storage system.

The motors utilized to rotate the carousels and to move the card transport assembly 61 for the picker fingers are stepping motors. The motors for the carousel are geared such that the carousel makes one revolution upon 10 revolutions of the motor and the motor is provided with 200 stops per revolution. The carousels are designed with sufficient card-receiving slots to provide 50 card positions per revolution of the motor and thus provide 4 motor steps per card position such that any microfiche card can be easily located through the electronic control of the motors.

A card which has been withdrawn from the carousels is moved by the card transport assembly 61 to a predetermined position at the viewing station 220, see FIG. 1. The viewing station 220 is positioned intermediate the two trays of the carousel and in the plane of the removal station of the two carousel trays and the load and unload slot of station 170. At this viewing station the card 30 is positioned between a lens holder 221 and a focal plane 223 by a clamping member 224 which is biased to the clamp position and mounted on a bracket 226 movable away from the film by the rotation of the cam shaft 121 and a cam 225. A light beam is projected to scan the image on the microfiche card and produce output signals which are converted to electrical signals which by analog-to-digital conversion can be changed to video signals for reproduction of the image on the video format at a remote terminal. The imaging system utilizes a mirror for projecting the light through the lens and this mirror is suitably supported by the mirror mount 228. The light beam generating and scanning device (not shown) is supported by frame 11 in the opening 229 below the mirror mount as shown in FIG. 1.

The present invention has been described and modifications can be made without departing from the spirit and scope of the invention as defined in the appended claims.

We claim:

1. In a microfiche card storage and retrieval system comprising a tray for receiving and storing in generally parallel position a plurality of cards and having a card transport device for moving preselected ones of said cards into and out of said storage means and for moving the cards along an XY axis in a predetermined plane to position the cards at a reading station, the improvement comprising:

load-unload station means positioned in the plane of movement of said card by said card-transport device, said load-unload station means comprising a chute having an inlet side adapted for receiving a card inserted therein by the operator, stop means for restricting the movement of the card through the chute, and means opposite said inlet side of said chute for guiding a microfiche card handled by said card transport means for directing a card into said chute from the opposite side.

2. A microfiche storage and retrieval system according to claim 1 wherein said stop means comprises a pin extending across the chute and having means for withdrawing said pin in response to an electrical signal.

3. A microfiche card storage and retrieval system according to claim 1 wherein said chute includes stop means adjacent an edge of said, chute for defining the height of said chute, said stop means being biased into a position to restrict the size of the card moveable into said chute, and being retractable against the bias of said spring for allowing a card to move out of said chute.

4. A microfiche card storage and retrieval system according to claim 1 wherein the plane of said chute is in the plane of a card positioned at said reading station.

5. A microfiche and storage and retrieval system according to claim 1 wherein said card transport device comprises carriage means for movement of a card in the X direction and frame means for movement of a card in the Y direction and said transport device extends to a height above said tray for receiving or discharging a card from said load-unload station means.

6. In a microfiche card storage and retrieval system comprising a pair of circular axially aligned trays for receiving and storing in generally parallel axially extending position a plurality of cards, a card transport device for moving preselected ones of said cards into and out of said storage trays when a selected card is positioned at a retrieval and inserting station positioned at a fixed position adjacent the peripheral edge of said trays, said transport device being mounted for movement on guide means along an XY axis in a predetermined plane to position the cards at a reading station, the improvement comprising:

load-unload station means positioned in the plane of movement of said card by said transport device and aligned with said retrieval and inserting station, said load-unload station means comprising a chute having an inlet side adapted for receiving a card inserted therein by the operator, stop means for restricting the movement of the card through the chute, and means opposite said inlet side of said chute for guiding a microfiche card handled by said transport means for directing a card into said chute from the opposite side by said transport device.

* * * * *